(12) United States Patent
Flake et al.

(10) Patent No.: US 8,799,077 B2
(45) Date of Patent: Aug. 5, 2014

(54) AD INTEGRATION AND EXTENSIBLE THEMES FOR OPERATING SYSTEMS

(75) Inventors: Gary W. Flake, Bellevue, WA (US); Lili Cheng, Bellevue, WA (US); Michael Connolly, Seattle, WA (US); Alexander G. Gounares, Kirkland, WA (US); Jeffrey R. Hemmen, Renton, WA (US); Eric J. Horvitz, Kirkland, WA (US); Kamal Jain, Bellevue, WA (US); Leonard Smith, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/767,741

(22) Filed: Jun. 25, 2007

(65) Prior Publication Data
US 2008/0154718 A1 Jun. 26, 2008

Related U.S. Application Data

(60) Provisional application No. 60/870,926, filed on Dec. 20, 2006.

(51) Int. Cl.
*G06Q 30/00* (2012.01)
*G09G 5/02* (2006.01)

(52) U.S. Cl.
USPC .......... 705/14.68; 345/699; 345/594

(58) Field of Classification Search
CPC .......... G09G 5/006; G09G 5/02; G06Q 30/02
USPC .......... 705/14, 513, 14.68; 707/1–20; 709/10–20; 345/738, 333, 699, 594
See application file for complete search history.

(56) References Cited

U.S. PATENT DOCUMENTS

| | | | |
|---|---|---|---|
| 4,570,227 A | | 2/1986 | Tachi et al. |
| 5,179,519 A | | 1/1993 | Adachi et al. |
| 5,220,507 A | | 6/1993 | Kirson |
| 5,608,635 A | | 3/1997 | Tamai |
| 5,835,881 A | | 11/1998 | Trovato et al. |
| 5,905,492 A | * | 5/1999 | Straub et al. .......... 715/744 |
| 5,911,773 A | | 6/1999 | Mutsuga et al. |

(Continued)

FOREIGN PATENT DOCUMENTS

| JP | 2004-280510 | | 10/2004 |
|---|---|---|---|
| JP | 2004280510 A | | 10/2004 |

OTHER PUBLICATIONS

Habel. "Incremental Generation of Multimodal Route Instructions," http://www.cs.niu.edu/~nlgdial/final/SS703CHabel.pdf, last access Dec. 11, 2006, 8 pages, Hamburg, Germany.

(Continued)

*Primary Examiner* — Sun Li
(74) *Attorney, Agent, or Firm* — Dave Ream; Leonard Smith; Micky Minhas

(57) ABSTRACT

The claimed subject matter relates to an architecture or extension to an operating system (or component thereof) that can facilitate extensible themes for or advertising integration with a desktop that is managed by the operating system. In particular, the architecture can acquire advertisement content such as ads or advertiser skins, select suitable content for display, and configure the operating system to display the selected content. The architecture also provides mechanisms for identifying suitable locations as well as appropriate time for displaying the content.

13 Claims, 11 Drawing Sheets

(56) References Cited

U.S. PATENT DOCUMENTS

| | | |
|---|---|---|
| 6,078,865 A | 6/2000 | Koyanagi |
| 6,119,065 A | 9/2000 | Shimada et al. |
| 6,161,127 A | 12/2000 | Cezar et al. |
| 6,298,304 B1 | 10/2001 | Theimer |
| 6,339,746 B1 | 1/2002 | Sugiyama et al. |
| 6,477,460 B2 | 11/2002 | Kepler |
| 6,526,350 B2 | 2/2003 | Sekiyama |
| 6,622,089 B2 | 9/2003 | Hasegawa et al. |
| 6,694,252 B2 | 2/2004 | Ukita |
| 6,728,635 B2 | 4/2004 | Hamada et al. |
| 6,748,225 B1 | 6/2004 | Kepler |
| 6,822,662 B1 | 11/2004 | Cook et al. |
| 6,898,518 B2 | 5/2005 | Padmanabhan |
| 6,952,647 B2 | 10/2005 | Hasegawa et al. |
| 7,103,473 B2 | 9/2006 | Ranjan |
| 7,827,527 B1 | 11/2010 | Chiluvuri |
| 2001/0007968 A1 | 7/2001 | Shimazu |
| 2001/0025223 A1 | 9/2001 | Geiger et al. |
| 2002/0164998 A1 | 11/2002 | Younis |
| 2002/0173905 A1 | 11/2002 | Jin et al. |
| 2003/0055729 A1* | 3/2003 | Bezos et al. .................. 705/14 |
| 2003/0079176 A1 | 4/2003 | Kang |
| 2003/0122864 A1* | 7/2003 | Jenne et al. .................. 345/738 |
| 2003/0182052 A1 | 9/2003 | DeLorme et al. |
| 2003/0200542 A1* | 10/2003 | Shaughnessy et al. ....... 717/174 |
| 2004/0059632 A1 | 3/2004 | Kang |
| 2005/0021656 A1 | 1/2005 | Callegari |
| 2005/0240756 A1* | 10/2005 | Mayer .............................. 713/2 |
| 2006/0031062 A1 | 2/2006 | Bakis et al. |
| 2006/0212220 A1 | 9/2006 | Bou-Ghannam et al. |
| 2006/0229941 A1 | 10/2006 | Gupta |
| 2006/0271277 A1 | 11/2006 | Hu et al. |
| 2008/0104103 A1 | 5/2008 | Adams |
| 2008/0108437 A1 | 5/2008 | Kaarela et al. |
| 2008/0207306 A1 | 8/2008 | Higbie |

OTHER PUBLICATIONS

Eugenio, et al. "Generating driving directions for intelligent vehicles interfaces," 12th IEEE International Conference and Workshops on the Engineering of Computer-Based Systems, 2005, 8 pages.

"MapmyIndia Rocks Indian Web2.0 with GoogleMap Type Digitised Mapping," http://www.webyantra.net/tag/mashup/, last accessed Mar. 16, 2007, 7 pages.

Koleszar. "A Landmark-Based Location Reference Grid for Street Maps," http://stinet.dtic.mil/oai/oai? &verb=getRecord &metadataPrefix=html&identifier=ADA070048, Defense Technical Information Center, Jun. 1, 1979, 1 pages.

"PDA Toshiba," http://www.citynotebookcentre.com.au/Products/PDA&CELL/Toshiba/toshiba_pda_e740.htm, last accessed Mar. 16, 2007, 3 pages.

Hampe et al. "Integrating topographic information and landmarks for mobile navigation," http://www.ikg.uni-hannover.de/publikationen/publikationen/2003/wien_hampe_elias.pdf, last accessed Mar. 14, 2007, 13 pages.

May et al. "Presence and Quality of Navigational Landmarks: Effect on Driver Performance and Implications for Design," http://magpie.lboro.ac.uk/dspace/bitstream/2134/2277/1/PUB284.pdf, last accessed Mar. 14, 2007, 40 pages, Loughborough, United Kingdom.

Assessing Spatial Distribution of Web Resources for Navigation Services http://www.sli.unimelb.edu.au/tomko/publications/tomko04case.pdf.

NFOA U.S. Appl. No. 11/767,810 mailed Aug. 15, 2011, 8 pages.

International Search Report, PCT/US2007/086655.

Notice of Allowance Nov. 23, 2011, U.S. Appl. No. 11/767,810.

* cited by examiner

AD INTEGRATION AND EXTENSIBLE THEMES FOR OPERATING SYSTEMS

CROSS-REFERENCE TO RELATED APPLICATIONS

This application claims the benefit of U.S. Provisional Application Ser. No. 60/870,926, filed Dec. 20, 2006, entitled "ARCHITECTURES FOR SEARCH AND ADVERTISING." In addition, this application is related to U.S. application Ser. No. 11/767,810, filed on Jun. 25, 2007, entitled "PROVIDING ALTERNATIVE CONTENT IN A WINDOWED ENVIRONMENT", which also claims the benefit of the above-mentioned U.S. Provisional Application. The entireties of these applications are incorporated herein by reference.

BACKGROUND

Advertisers have long been preoccupied with the search for new and better ways of reaching, understanding, and/or targeting a potential audience for their advertisement content. In addition, advertisers are also continually searching for new platforms or venues to host advertisement content, preferably in a manner that maintains a high degree of audience attention. The widespread growth of the Internet serves as one illustration of advertisers' preoccupation with finding new markets. As Internet usage boomed, so too did Internet advertising.

However, although literally millions of people world-wide spend a substantial amount of time directly interacting with computers on a daily basis, conventionally, computer-based user-interfaces such as desktops or other features maintained by an operating system remains relatively untapped by advertising concerns.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate extensible themes and/or advertising integration in connection with an operating system user-interface such as a desktop. To these and other related ends, the architecture can be interfaced to or implemented as an extension of a computer-based operating system or components thereof such as a desktop environment manager, a window manager, and so forth.

In accordance therewith, the architecture can acquire advertisement content from an advertiser. The advertisement content can be, e.g. a product advertisement, a link to the advertisement, an extensible and/or configurable skin, typically related to an advertiser's brand or trademark, an update, as well as other applicable types of advertisement content. The advertisement content can be stored for later retrieval and can further be examined for suitability for display based upon a wide range of potential criteria. For example, suitable content can be selected based upon preferences or settings designated by the user, by the implementation, and/or by default.

The advertisement content can also be selected based upon a bidding model wherein advertisers can compete for ad-slots, based upon contractual obligations or rights associated with either advertisers or end-users of the operating system. In addition, the advertisement content can be selected based upon transaction histories and/or demographic information, wherein such information need not be transmitted or revealed to third parties or otherwise be accessible to remote systems or entities. Accordingly, aspects of the claimed subject matter can serve to mitigate privacy concerns with respect to marketing and/or ad-targeting.

According to another aspect of the claimed subject matter, the advertisement content can be extended to other user-interfaces that are launched, accessed, and/or instantiated by the desktop or the associated operating system. Examples of such can include but are not limited to disparate applications, web portals and so forth.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
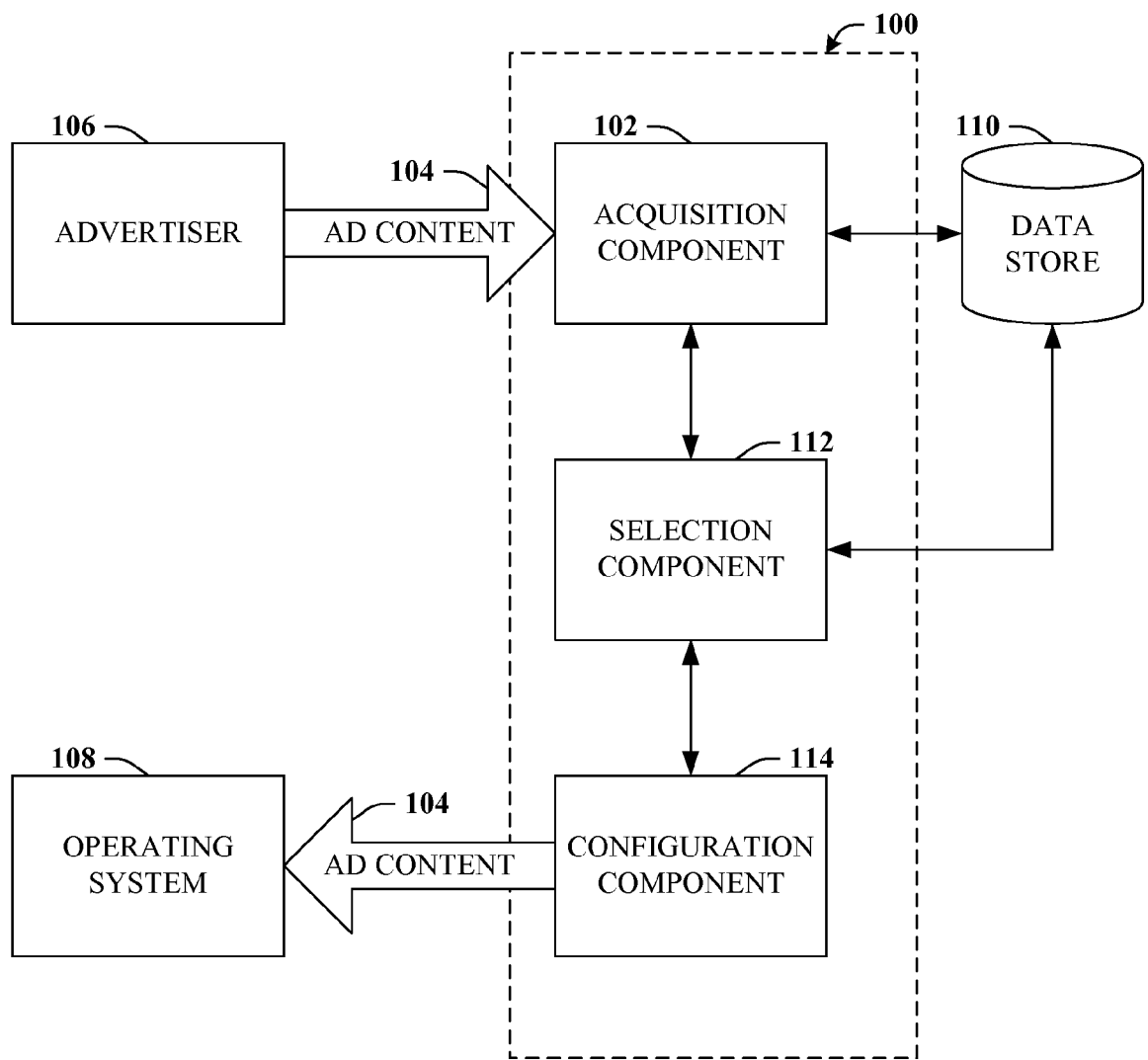
FIG. 1 is a block diagram of a computer-implemented system that can facilitate extensible themes and/or advertising integration in connection with an operating system user-interface.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "desktop", "skin", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer implemented system 100 that can facilitate extensible themes and/or advertising integration in connection with an operating system user-interface is depicted. Generally, the system 100 can include an acquisition component 102 that can obtain advertisement content 104 from an advertiser 106. According to an aspect of the claimed subject matter, the advertisement content 104 can be specifically designed and/or tailored expressly for display by an operating system 108. The acquisition component 102 can also store the advertisement content 104 to a data store 110, which can be interfaced to the system 100 as depicted, or, additionally or alternatively, the data store 110 can be a component of the system 100.

Likewise, the system 100 can be interfaced to the operating system 108, while according to additional aspects, the system 100 or portions thereof can be components of the operating system 100. For example, the system 100 (or portions thereof) can be a component or components of an operating system desktop environment manager or another similar mechanism provided by the operating system 108 that can manage user-interfaces for the operating system 108.

In addition, the system 100 can also include a selection component 112 that can select the advertisement content 104 for display, and a configuration component 114 that can supply the advertisement content 104 to the operating system 108. The advertisement content 104 is described in more detail in conjunction with FIG. 2, while the selection component 112 is further described in connection with FIG. 3. It is to be appreciated that whether interfaced to or a component of the operating system 108, the configuration component 114 can, potentially depending upon a type of the advertisement content 104, supply the advertisement content 104 to an appropriate component of the operating system 108 such that the advertisement content 104 can be rendered for display in a desktop environment. It is also to be appreciated that is some situations the advertisement content 104 can be forwarded to and/or displayed by a user-interface associated with a disparate or third party application, however, the acquisition, selection, and/or configuration of the advertisement content 104 is generally not handled or managed by the third party application.

Figure 2:
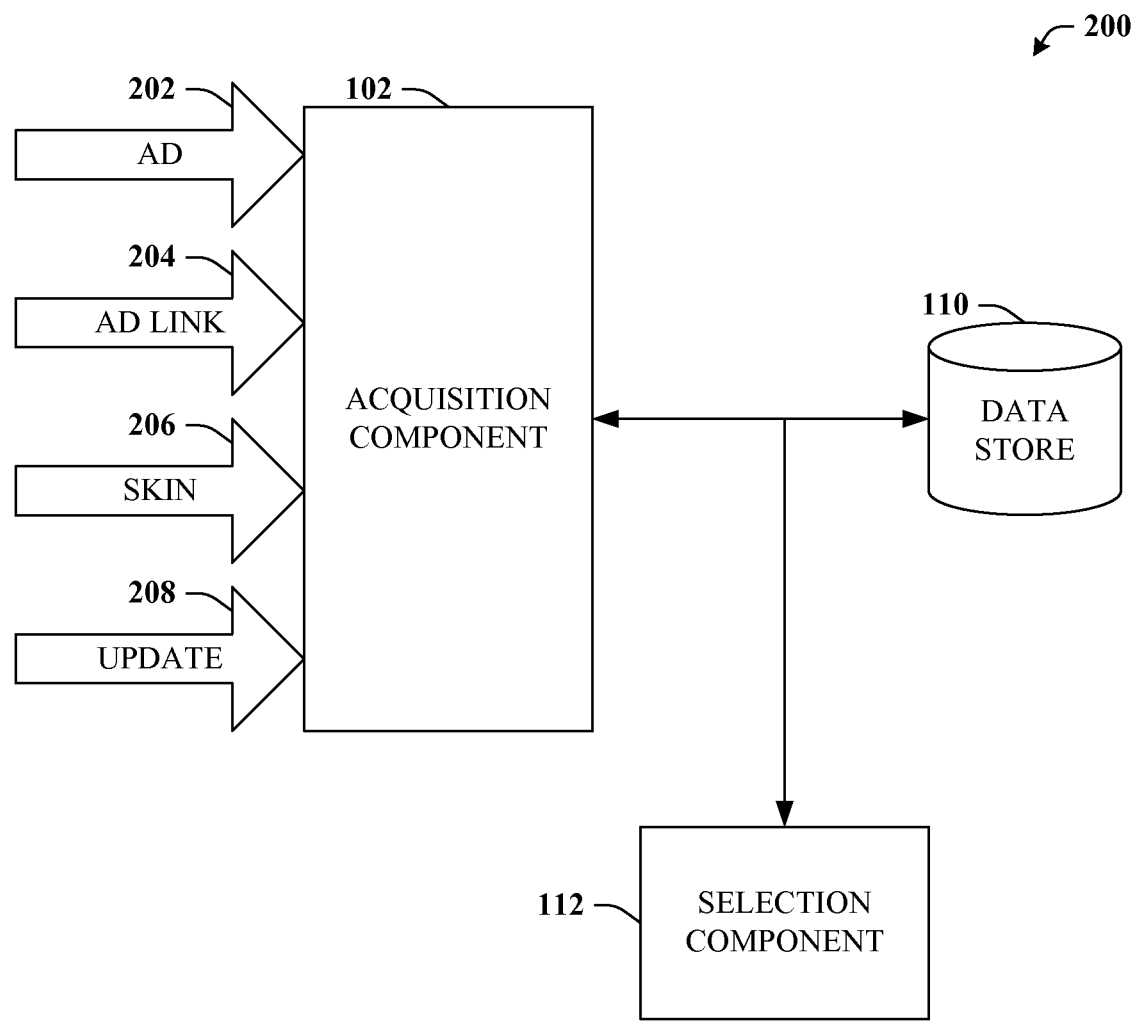
FIG. 2 provides a block diagram of a computer-implemented system that illustrates further detail in connection with the acquisition component 102 and provides various examples of advertisement content.

Turning now to FIG. 2, a computer-implemented system 200 that illustrates further detail in connection with the acquisition component 102 and further illustrates various examples of advertisement content 104 can be found. Typically, the system 200 can include the acquisition component 102 that, as substantially described supra, can obtain advertisement content 104, which can be tailored for the operating system 108 to display, and that can also store the advertisement content 104 to the data store 110. The system 200 can also include the selection component 112 that can, e.g., access the data store 110 in order to choose the advertisement content 104 that is to be displayed.

The system 200 further depicts a number of example types of advertisement content 104, which are indicated by reference numerals 202-208. According to an aspect of the claimed subject matter, the advertisement content 104 can be an advertisement 202 for a product such as a good or service. The advertisement 202 can include a product description, a coupon or other incentive, as well as suitable text, images, audio, video, executable content and so forth. The advertisement 202 can be displayed in a static form, and activated (e.g., become dynamic) based upon an event such as a mouse or cursor hover or the like.

In addition, the advertisement content 104 can be a link 204 or reference to the advertisement 202. For example, the link 204 can include anchor text that addresses the advertisement 202 or content associated therewith. The advertisement 202 can therefore be called based upon an event such as a mouse click or other input device selection mechanism. It is to be appreciated that in order to activate the advertisement 202, the operating system can launch a disparate and/or third party application such as a web or content browser, a content/media player, or a similar application.

According to another aspect of the claimed subject matter, the advertisement content 104 can be an extensible skin 206 for a desktop or another user-interface associated with the operating system 108. In particular, various features of a desktop (or other user-interfaces of the operating system 108) can be displayed with customized audio/visual interface aspects as well as in some cases customized content, settings, or defaults. The skin 206 can be tailored to a theme, brand, trademark, etc. associated with the advertiser 106. Hence, that advertiser 106 can be, say, a well-known producer of cola beverages and the associated skin 206 can include customized graphical appearances for the desktop that exhibit visual aspects of the producer's brands as well as audio trademarks or themes, and so on.

The skin 206 can apply to, and thus facilitate customization of, virtually any feature of the desktop such as windows, taskbars, sidebars, avatars, icons, background, screensaver, alerts, bugs, tickers, and so on, and can even be extended to disparate applications and service portals as further described with reference to FIG. 4. In accordance therewith, the skin 206 can represent an excellent way to further brand recognition for the advertiser 106. Moreover, it is to be appreciated that the skin 206 can be both trendy as well as useful. Thus, a user of the operating system 108 might be attracted to the skin 206 not only because it is aesthetically appealing, but also because of customized interface options provided by the skin 206 that make some tasks more efficient or more intuitive for the user of the skin 206.

In another aspect, the advertisement content 104 can be an update 208. In particular, the advertisement content 104 can be updated to provide new advertisement content 104 periodically, or updated as new advertisement content 104 becomes available from the advertiser 106. It is to be appreciated that reference numerals 202-208 are merely examples of advertisement content 104 intended to provide context but not necessarily intended to limit the scope of the claimed subject matter to only the described types of advertisement content 104. Accordingly, other types of advertisement content 104 can exist and can be applicable to the appended claims.

Figure 3:
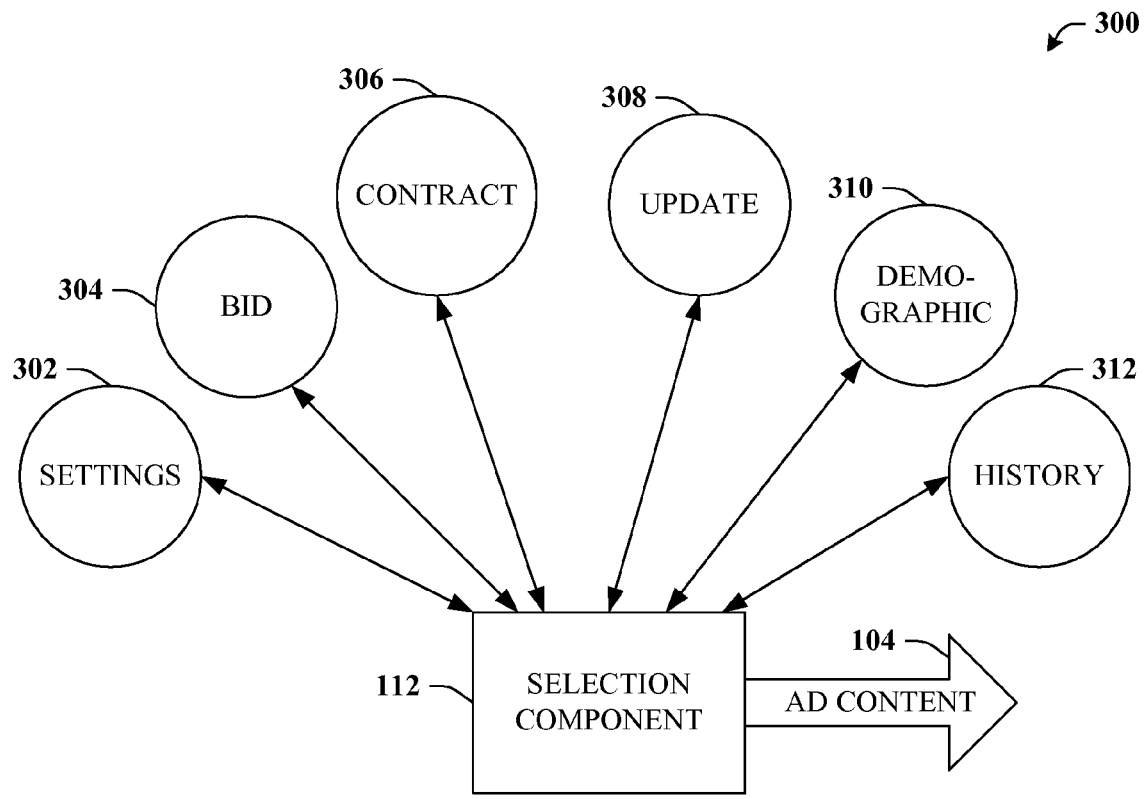
FIG. 3 is a block diagram a computer-implemented system that depicts various features of the selection component in greater detail.

With reference now to FIG. 3, a computer-implemented system 300 that depicts various features of the selection component in greater detail is depicted. In general, the system 300 can include the selection component 112 that can select the advertisement content 104 as substantially described herein. In accordance with one aspect of the claimed subject matter, the selection component 112 can select the advertisement content 104 based upon a set of preferences or settings 302 associated with the operating system 108 and/or the desktop. For example, the settings 302 can be default settings, as well as settings designated by the operating system 108 or a user of the operating system 108.

In particular, in this case, the advertisement content 104 that can be displayed on the desktop can be expressly specified, such as when choosing a particular skin 206. Additionally or alternatively, certain types of advertisement content 104 that can be selected for display can be more generally specified, such as advertisements 202 that relate to a particular type of product or service, or advertisement content 104 of only a particular type (e.g., reference numerals 202-208) can be displayed. In another aspect, the settings 302 can specify advertisement content 104 that meets various other criteria such as a minimum discount level (e.g., 33% or greater off list price), or that has been rating or ranked in a particular fashion (e.g., video-based commercials that users have rating as humorous).

Furthermore, the settings 302 can relate to particular features or regions of the desktop as well as to certain times. For instance, it can be specified that only the upper right-hand portion of the desktop should be populated with advertisement content 104 (e.g., a particular region) or that only a side bar and window title bars are appropriate for advertisement content 104 (e.g., a particular feature of the desktop). As another example, it can be specified that advertisement content 104 should only be displayed at certain times, which can be defined temporally such as only on weekends or after 6:00 pm, or defined by events, such as only during installations, downloads, or while a screen saver is active. It is to be appreciated that all of the above can be accomplished by way of the settings 302, which can be employed by the selection component 112 in order to select appropriate and/or suitable advertisement content 104.

According to another aspect, the selection component 112 can utilize a bid 304 from the advertiser 106 in order to select the advertisement content 104 for display on the desktop. In particular, one or more advertisers 106 can economically compete for advertising space and/or user attention. The selection component 112 can select the advertisement content 104 with respect to a highest bidder or based upon a variety of other criteria such as advertiser 106 ranking, product quality, as well as information particular to the user, such as transaction histories or profiles, which is further detailed infra.

Furthermore, a contractual obligation 306 can provide another example of criteria the selection component 112 can employ to select advertisement content 104. For example, a contract 306 can be formed with an advertiser 106 providing that, e.g., a certain number of impressions or a certain amount of time of display for the advertising content 104 will be provided to users of the desktop. Likewise, the contract 306 can exist with a user of the desktop. For instance, incentives can be provided to the user such as a free or discounted operating system 108 (as well as virtually any other type of consideration or incentive) in exchange for activating, say, a skinning feature (e.g., skin 206), or allowing other types of advertisement content 104 to be displayed, possibly under certain agreed upon conditions. Thus, in accordance with the agreement/contract 306, the selection component 112 can select the actual advertisement content 104 for display, or select a set of advertisement content 104, and allow the user to choose from the set, or select one instance of the advertisement content 104 from a user-selected set.

In yet another aspect, the selection component 112 can select the advertisement content 104 based upon an update 308. For instance, certain advertisement content 104 can be newly received or modified in whole or in part. Upon the occurrence of an update 308, the selection component can re-evaluate the content for display. It is to be appreciated that the selection component 112 need not select advertisement content 104 associated with an update 308, but rather can select the advertisement content 104 as a result of an occurrence of the update 308.

In accordance with other aspects of the claimed subject matter, the selection component 112 can choose the advertisement content 104 based upon demographic information 310 such as a profile associated with a user of the desktop as well as based upon an interaction/transaction history 312. In particular, a user profile can be aggregated based upon a history 312 of transactions by a user such as past purchases, clicks, navigation, etc. as well as demographic data 310 such age, gender, income, expenses, and potentially including personal information relating to hobbies, interests, likes, dislikes, and so on. In essence, the selection component 112 can serve as an ad-targeting mechanism for the advertisement content 104, however, unlike many conventional ad-targeting mechanism, the selection component 112 can reside on a local machine of the user. Thus, information that a user may consider personal, private, or otherwise does not wish to propagate can still be utilized by the selection component 112, while at the same time potentially mitigating privacy concerns of the user. It should be understood that the criteria 302-312 are not intended to be mutually exclusive. Thus, the selection component 112 can utilize one or more of the criteria 302-312 simultaneously or in sequence in order to select the advertisement content 104 for display.

Figure 4:
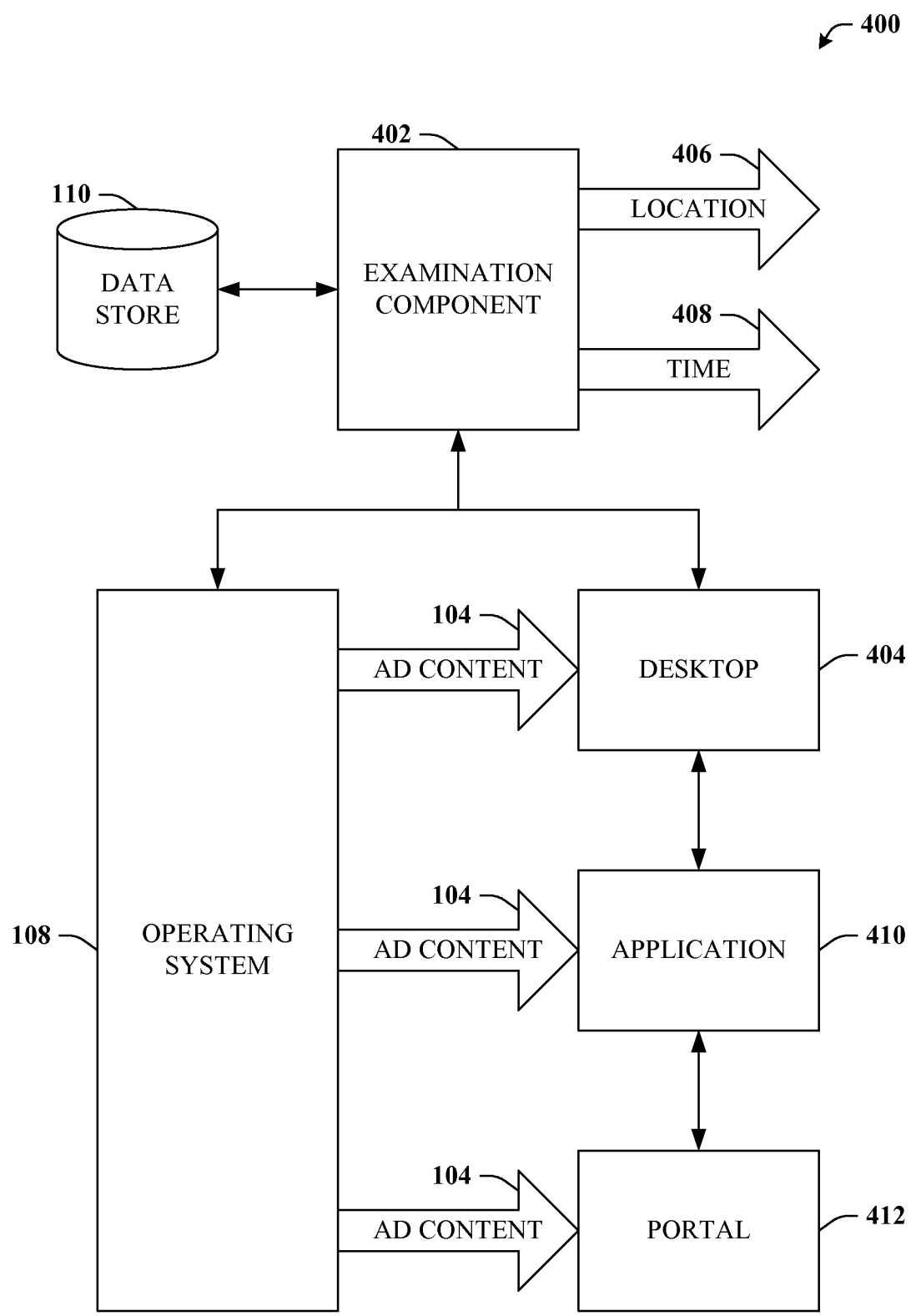
FIG. 4 illustrates a block diagram a computer-implemented system that can monitor a user-interface to determine potential suitability for advertisement content.

Referring now to FIG. 4, a computer-implemented system 400 that can monitor a user-interface to determine potential suitability for advertisement content is illustrated. Typically, the system 400 can include an examination component 402 that can be an independent component as depicted, while, in other scenarios, the examination component 402 can be a subcomponent of the selection component 112. The examination component 402 can determine or infer a suitable location 406 for display of the advertisement content 104. For example, the examination component 402 can monitor a desktop 404 associated with the operating system 108 in order to identify unused, non-occluded, or nonessential display space. Unused space can be portions of the desktop 404 that display content or colors of a background (e.g., desktop 404 background, a window background . . . ). Non-occluded space can be space on the desktop 404 that is not currently concealed by other objects. Nonessential space can be space on the desktop 404 that exhibits a homogenous pattern or color scheme or provides information that is determined to be non-utilitarian and/or merely aesthetic or redundant.

It is to be appreciated that whether or not a location 406 included unused or non-essential display space can differ based upon a type of advertisement content 104. For example, advertisement content 104 that can be displayed as a watermark can have different applications than advertisement content 104 associated with a streaming video. It is to be further appreciated that location 406 may need to meet certain size or dimension prerequisites based upon the advertisement content 104 or based upon a type of advertisement content 104 that is selected for display. Additionally or alternatively, the selection component 112 can select advertisement content 104 that meets the size or dimensions of the location identified by the examination component 402.

According to another aspect of the claimed subject matter, the examination component 402 can also determine an appropriate time 408 for display of the advertisement content 104. Hence, the examination component 402 can monitor either or both of the operating system 108 (or activity thereof) or the desktop 404 in order to identify a waiting period or a lapse in task-oriented activity of a user. Such wait times or lapses can be utilized for determining an appropriate time 408 in which to display the advertisement content 104.

In another aspect of the claimed subject matter, it is to be understood that the operating system 108 can apply and/or output for display the advertisement content 104. Typically, the advertisement content 104 is applied to the desktop 404, however, it is to be appreciated that the operating system can, in some cases, apply the advertisement content 104 to other user-interfaces, such as a user-interface of an application 410 launched by the operating system 108 or a user-interface for a portal 412 accessed by the operating system 108. As one example, consider a skin 206 applied to the desktop 404 as described herein. In addition, the skin 206 can be extended to a user-interface of the application 410 or to a user-interface of a portal 412, such as a web portal.

Figure 5:
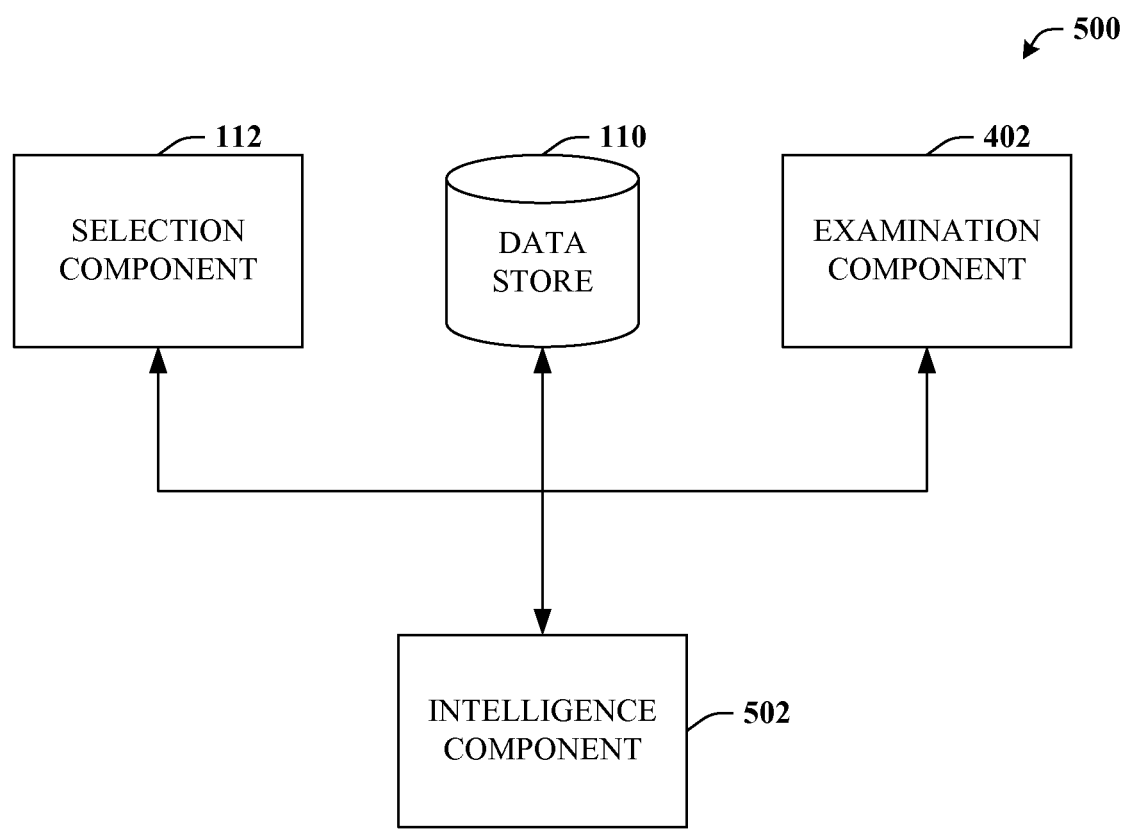
FIG. 5 depicts a block diagram of a computer-implemented system that can provide for various inferences and/or determinations.

Turning briefly to FIG. 5, a computer-implemented system 500 that can provide for various inferences and/or determinations is depicted. The system 500 can include the selection component 112 that can select suitable advertisement content 104 for display and the examination component 402 that can determine suitable locations 406 and appropriate times 408 for display of the advertisement content 104 as substantially described above in connection with, inter alia, FIGS. 3 and 4, respectively. In addition, the system 500 can also include an intelligence component 502 that can potentially aid one or both of the selection component 112 or the examination component 402 based upon, e.g. various machine learning techniques. In accordance therewith, the intelligence component 502 can be operatively coupled to or be subcomponents of one or both the selection component 112 or the examination component 402.

Thus, while a number of examples have already been illustrated, it is to be appreciated that the selection component 112 and the examination component 402 can also access or employ the features of the intelligence component 502. In particular, the intelligence component 502 can access the data sets associated with criteria 302-312, as well as the data store 106 and any or portions of the data available to the examination component 402 in order to intelligently aid in one, all or portions of the selection of advertisement content 104, the determination of a suitable location 406, the determination of an appropriate time 408, as well as other determinations or inferences.

In particular, the intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 6, 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
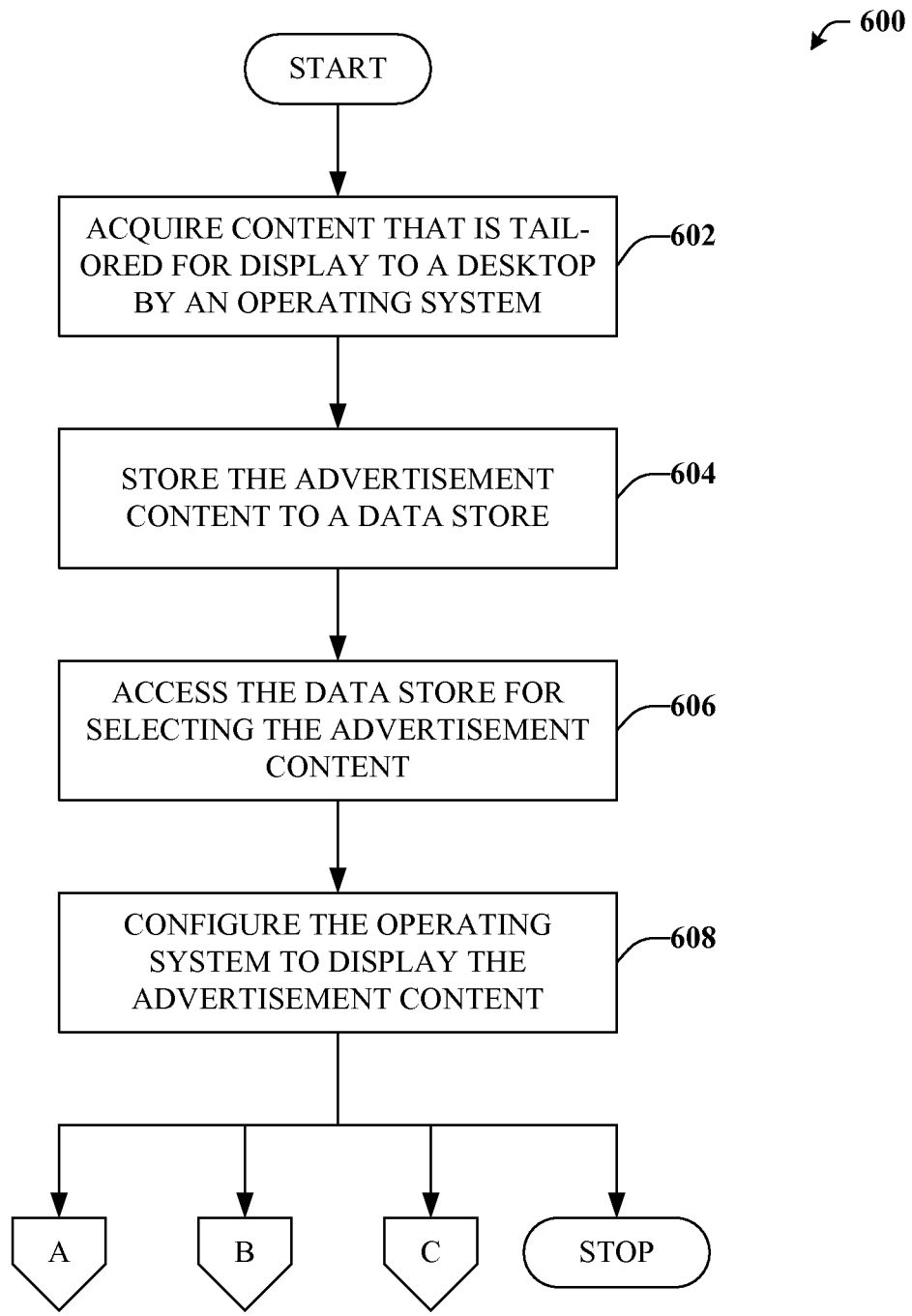
FIG. 6 is an exemplary flow chart of procedures that define a computer implemented method for facilitating extensible themes for and/or advertising integration with an operating system user-interface.

Turning now to FIG. 6, an exemplary computer implemented method 600 for facilitating extensible themes for and/or advertising integration with an operating system user-interface is provided. In general, at reference numeral 602, advertisement content that is tailored for display by an operating system on a desktop can be acquired from an advertiser. That is, advertisement content can be acquired from the advertiser, wherein the content is tailored for a desktop associated with an operating system. Hence, the content can be tailored for display by the operating system.

At reference numeral 604, the advertisement content can be stored to a data store, and at reference numeral 606 the data store can be accessed for selecting the advertisement content for display. Additional aspects associated with the act of selecting can be found in connection with FIG. 7 infra. At reference numeral 608, the operating system can be configured to display the advertisement content by way of the desktop. For example, suitable components of the operating system such as a window manager or a desktop environment manager can be configured to display the advertisement content, e.g. by way of standardized system calls.

Figure 7:
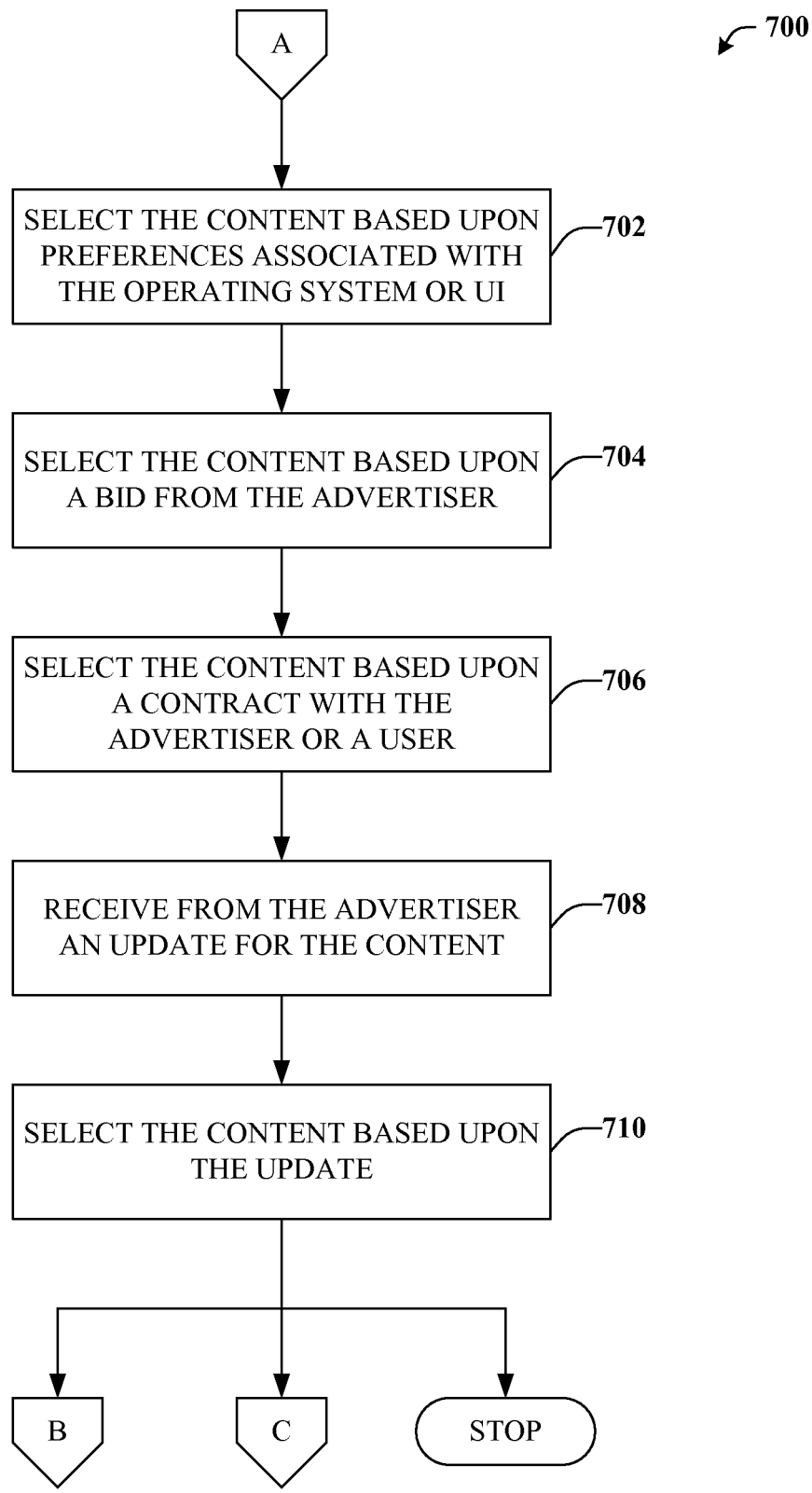
FIG. 7 depicts an exemplary flow chart of procedures that define a computer implemented method for selecting advertisement content based upon a variety of potential criteria.

With reference now to FIG. 7, an exemplary computer implemented method 700 for selecting advertisement content based upon a variety of potential criteria is depicted. Initially, at reference numeral 702, the advertisement content can be selected based upon preferences associated with the operating system or desktop. It is to be appreciated that the preferences can relate to user-designated preferences as well as default or system-designated preferences. For example, the preferences can pertain to expressly selecting certain advertisement content or types of advertisement content or, additionally or alternatively to filtering certain particular or types of advertisement content. Thus, e.g., a particular skin can be selected as a preference or a particular type of advertisement can be filtered by the preferences. Moreover, certain regions of a desktop or certain objects or features associated therewith can be designated as preferred a recipient of advertisement content, or conversely designated to be free from advertisement content. Likewise, preferences can be associated with particular times or event-based occurrences, such that advertisement content can be displayed or precluded based upon those preferences.

At reference numeral 704, the advertisement content can be selected based upon a bid from the advertiser. In accordance therewith, the content selection can be related to a bidding model, wherein advertisers can place bids on ad-slots that are available on the desktop. It is to be appreciated that the bidding model can be base upon not only a price paid for an ad-slot, but based upon many additional features as well, including but not limited to features of the advertiser (e.g., a quality or ranking of the advertiser), features of the desktop or ad-slot (e.g., dimensions, available types of content, location, time, duration . . . or features of the user (e.g., demographics, transaction history, contractual obligations, and so on).

At reference numeral 706, the advertisement content can be selected based upon a contractual agreement with at least one of the advertiser or a user of the operating system or desktop. For example, the advertiser can contract for the right to display certain advertisement content, which can be a basis for the selection of advertisement content. Conversely the user can contract for the obligation to receive certain advertisement content, which can likewise provide a basis for the selection.

At reference numeral 708, an update for the advertisement content can be received from the advertiser, and at reference numeral 710, the advertisement content can be selected based upon the update or the act of receiving the update.

Figure 8:
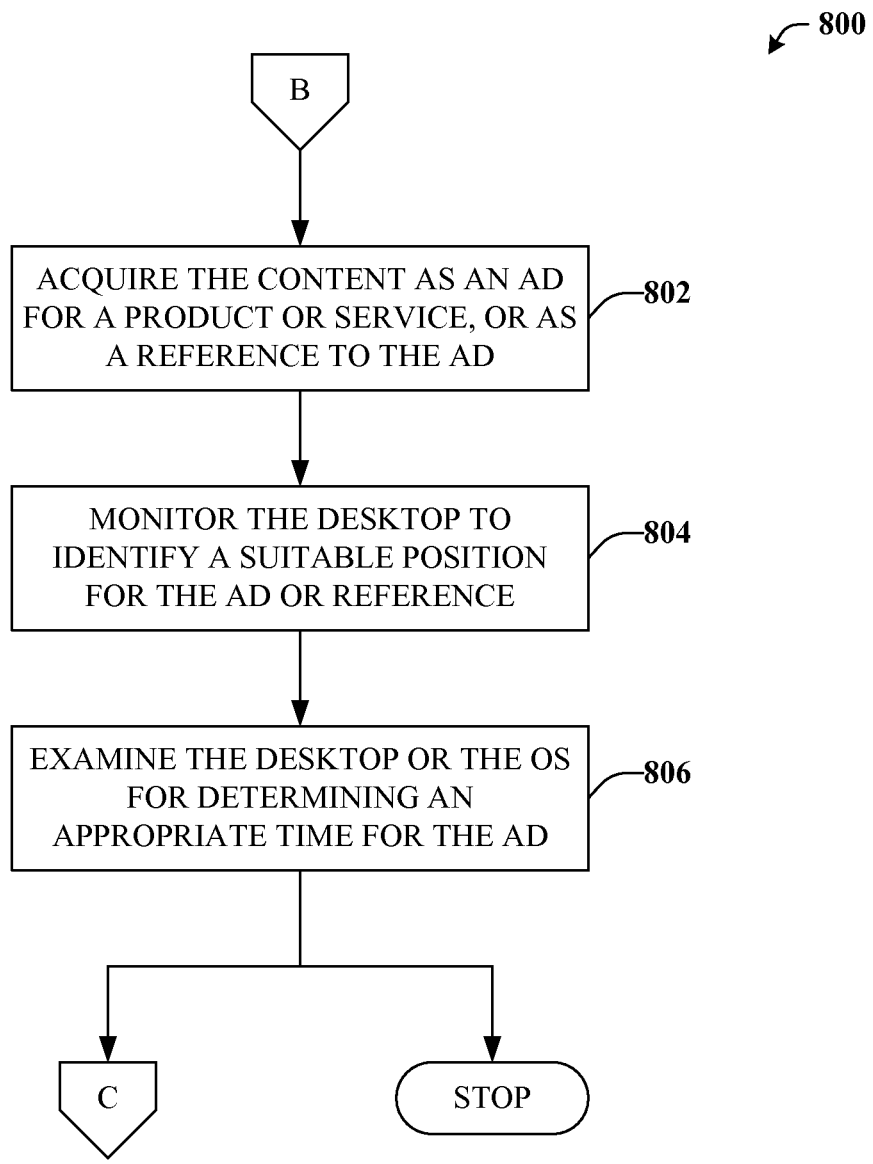
FIG. 8 illustrates an exemplary flow chart of procedures for a computer implemented method for determining a suitability or appropriateness for display of particular types of advertisement content.

Turning briefly to FIG. 8, an exemplary computer implemented method 800 for determining a suitability or appropriateness for display of particular types of advertisement content is illustrated. Most generally, at reference numeral 802, It is to be appreciated that the advertisement can include substantially any type of audio, visual, or executable content and the reference to the advertisement can invoke disparate applications or portals in order to facilitate the display of the advertisement.

At reference numeral 804, the desktop can be monitored to identify a suitable position for display of the advertisement or the reference. For example, the suitable position can be identified based upon a size or dimensions of an object, space, region of the desktop as well as based upon the content that currently exists at a particular position. At reference numeral 806, the desktop, operating system, or activity associated therewith can be examined for determining an appropriate time for displaying the advertisement or reference. For instance, the appropriate time can be determined based upon calendar time as well as based upon event-based occurrence such as user activity, downloads or installations, or other events that tend to indicate the user is not task-oriented and would thus likely be more receptive and/or focused on the advertisement or reference.

Figure 9:
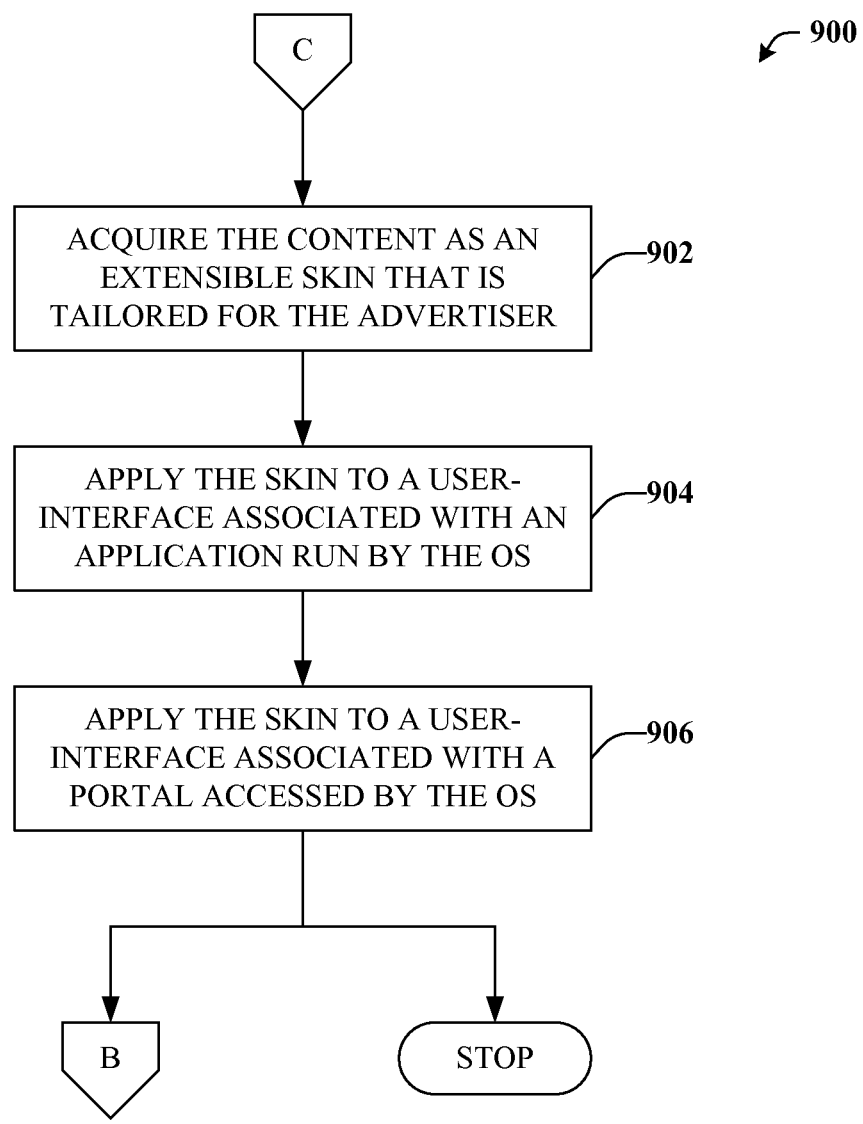
FIG. 9 depicts an exemplary flow chart of procedures defining a computer implemented method for applying an extensible skin from an advertiser.

With reference now to FIG. 9, an exemplary computer implemented method 900 for applying an extensible skin from an advertiser is depicted. In general, at reference numeral 902, the advertisement content can be acquired as an extensible skin for a the desktop, wherein the skin can be crated based upon a theme, brand, or trademark associated with the advertiser. More particularly, advertisement content such as that acquired at act 602 of FIG. 6 can be in the form of a skin, e.g., tailored and/or designed by the advertiser. It should be understood that the skin can be applied to a desktop and/or to various features thereof by way of, e.g. a desktop environment manager, a window manager, or the like.

At reference numeral 904, the skin can be applied to a user-interface associate with a disparate application launched by the operating system. Appreciably, applying the skin to the disparate application can be substantially similar to accomplished in a manner similar to constructing user-interface objects or features, with the distinction being that rather than constructing the features with conventional inbuilt operating system components, these features can be constructed with components designed, supplied, updated, and/or directed to the advertiser to, e.g., facilitate advertising, brand recognition, consumer goodwill and so forth. Similarly, at reference numeral 906, the skin can be applied to a user-interface associated with a portal accessed by the operating system. Hence, the skin can be extended to, say, a web portal such that the skinning features are consistent throughout the standard desktop and the portal.

Figure 10:
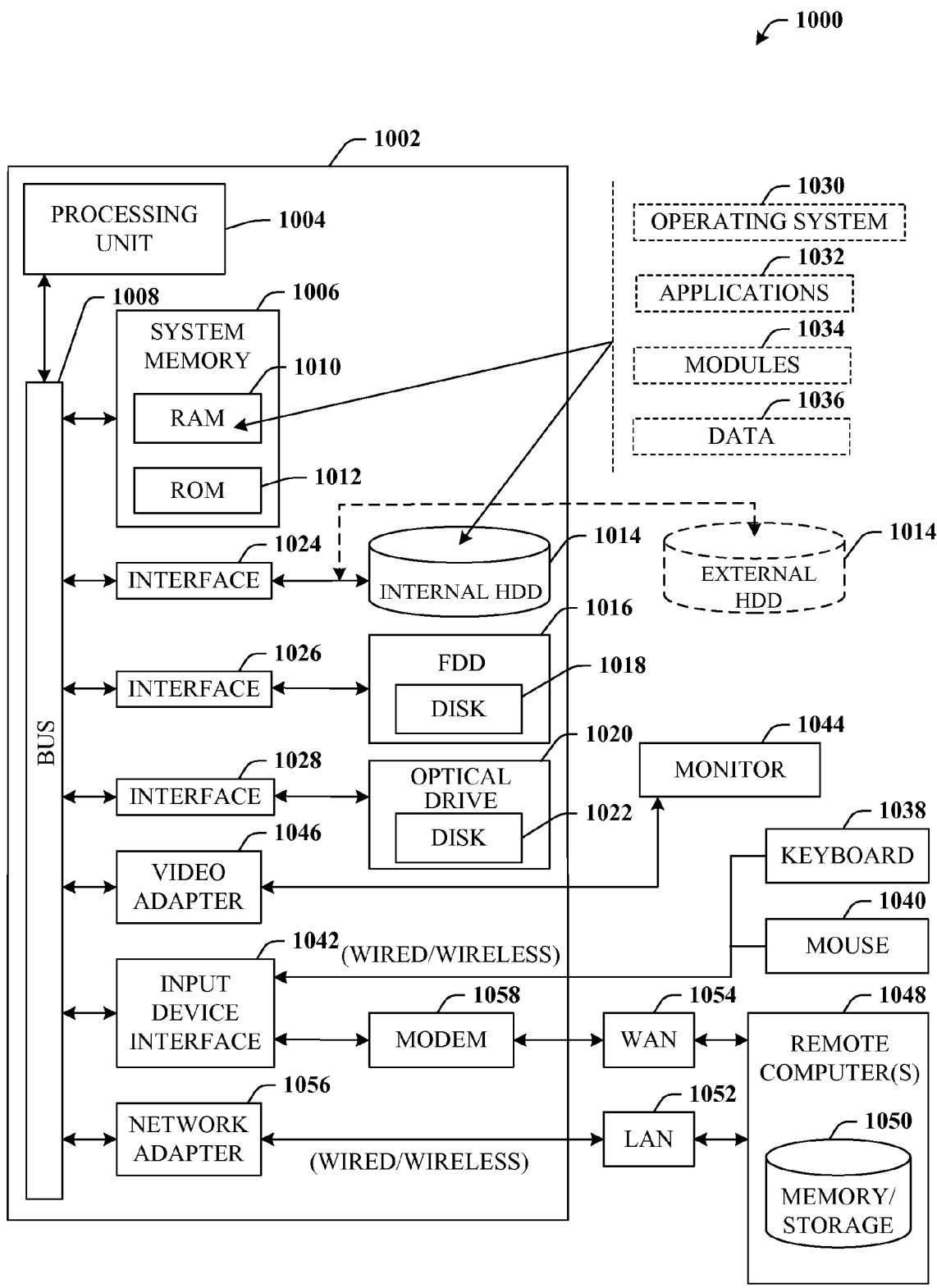
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
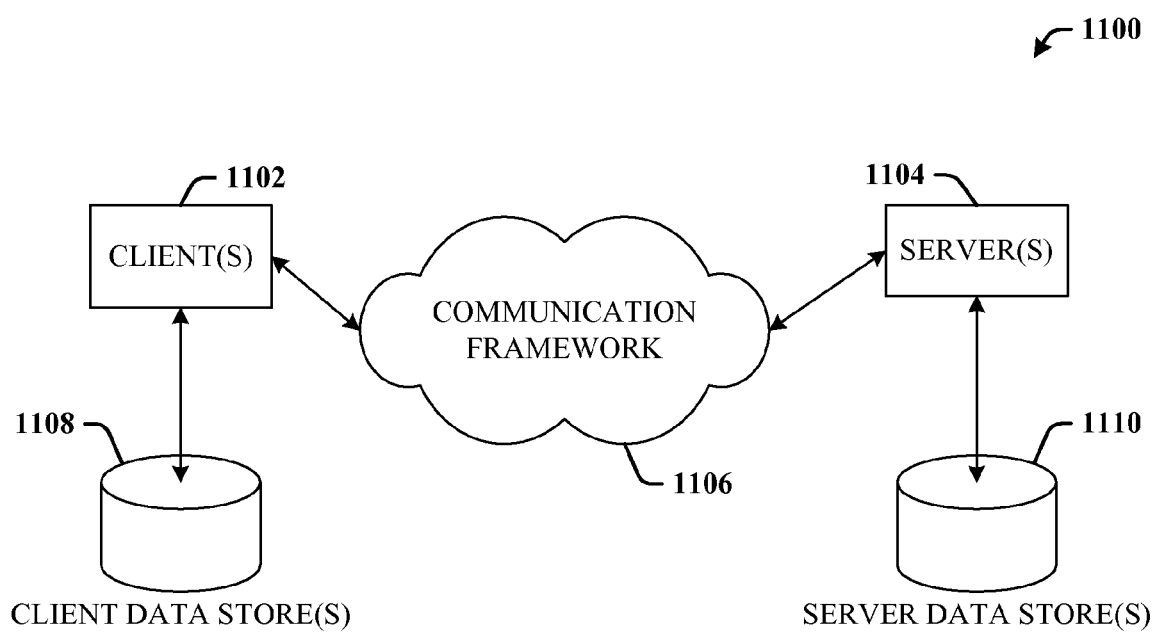
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented method for facilitating extensible themes and/or advertising integration with a user-interface associated with an operating system, the method comprising:

acquiring from an advertiser, a first advertisement content that is tailored for display in association with the user-interface associated with the operating system, wherein the user-interface associated with the operating system is a desktop displayed on a local computer, and wherein the first advertisement content includes an advertisement for a product or service;

storing the first advertisement content to a data store on the local computer;

identifying a first unused, non-occluded, or nonessential display space for displaying an advertisement;

accessing the data store on the local computer for selecting the first advertisement content;

automatically selecting, by a processor, the first advertisement content from the data store without user intervention and based on a set of preferences associated with the operating system or the desktop, the selected first advertisement content being selected based on at least a size or dimension of the identified first unused, non-occluded, or nonessential display space;

configuring the operating system to display the first advertisement content by way of the desktop;

receiving a setting designated by the operating system or a user of the operating system related to a region or a feature of the desktop;

identifying, based on at least the received setting related to a region or feature of the desktop, a second unused, non-occluded, or nonessential display space for displaying an advertisement, the second unused, non-occluded, or nonessential display space being different from the first unused, non-occluded, or nonessential display space;

automatically selecting, by the processor, a second advertisement content from the data store without user intervention and based on a set of preferences associated with the operating system or the desktop, the selected second advertisement content being selected based on at least a size or dimension of the identified second unused, non-occluded, or nonessential display space; and configuring the operating system to display the second advertisement content by way of the desktop.

2. The method of claim 1, wherein the user-interface associated with the operating system is a user-interface of an application launched by the operating system.

3. The method of claim 1, wherein the user-interface associated with the operating system is a user-interface for a portal accessed by the operating system.

4. The method of claim 1, further comprising at least one of the following acts: selecting the advertisement content based upon a bid from an advertiser; or selecting the advertisement content based upon a contractual agreement with at least one of the advertiser or a user of the operating system.

5. The method of claim 1, further comprising at least one of the following acts:

acquiring the advertisement content as a reference to the advertisement; or examining at least one of the desktop or the operating system for determining an appropriate time for displaying the advertisement or the reference.

6. The method of claim 1, further comprising at least one of the following acts:

acquiring the advertisement content as an extensible skin for the desktop, the skin tailored to a theme, brand, or trademark associated with the advertiser;

applying the skin to a user-interface associated with an application launched by the operating system; or applying the skin to a user-interface associated with a portal accessed by the operating system.

7. The method of claim 1, further comprising receiving updated advertisement content, wherein the second advertisement content comprises the updated advertisement content.

8. The method of claim 7, wherein the identifying of the second unused, non-occluded, or nonessential display space being responsive to receiving the updated advertisement content.

9. The method of claim 1, further comprising receiving updated advertisement content, the identifying of the second unused, non-occluded, or nonessential display space being responsive to receiving the updated advertisement content, wherein the second advertisement content is different from the updated advertisement content.

10. The method of claim 1, wherein the selected second advertisement content is selected based at least in part on a locally stored user profile, the locally stored user profile comprising demographic data about a user.

11. The method of claim 10, further comprising receiving updated advertisement content, the identifying of the second unused, non-occluded, or nonessential display space being responsive to receiving the updated advertisement content, wherein the second advertisement content comprises the updated advertisement content.

12. The method of claim 10, further comprising receiving updated advertisement content, the identifying of the second unused, non-occluded, or nonessential display space being responsive to receiving the updated advertisement content, wherein the second advertisement content is different from the updated advertisement content.

13. The method of claim 10, further comprising at least one of the following acts:

selecting the advertisement content based upon a bid from an advertiser; or selecting the advertisement content based upon a contractual agreement with at least one of the advertiser or a user of the operating system.

\* \* \* \* \*